United States Patent [19]

Sporzynski et al.

[11] Patent Number: 4,930,606

[45] Date of Patent: Jun. 5, 1990

[54] DISC BRAKE ROTOR

[75] Inventors: Robert S. Sporzynski, Chelsea; Anthony C. Evans, Northville; Richard T. Robinette, St. Clair Shores, all of Mich.

[73] Assignee: Kelsey-Hayes Company, Romulus, Mich.

[21] Appl. No.: 224,097

[22] Filed: Jul. 26, 1988

[51] Int. Cl.⁵ ............................................. F16D 65/12
[52] U.S. Cl. ............................................... 188/218 XL
[58] Field of Search ........... 188/73.1, 218 R, 218 XL; 192/106.1, 107 R

[56] References Cited

U.S. PATENT DOCUMENTS 2,215,420  9/1940  Eksergian ..................... 188/218 X
4,263,992  4/1981  Moore et al. .................. 188/218 X

FOREIGN PATENT DOCUMENTS 223935   1/1958   Australia ..................... 188/218 X
7901105  12/1979  Fed. Rep. of Germany .
1027686   4/1966  United Kingdom ........... 188/218 X
2033509   5/1980  United Kingdom .

Primary Examiner—Duane A. Reger
Attorney, Agent, or Firm—Ralph J. Skinkiss; David Purdue

[57] ABSTRACT

A composite rotor and an improved hat section structure therefor, wherein the hat section is formed to include a rim having a non-planar, rotor-engaging periphery. A rotor discoid is then cast around the hat section so that a portion of the rotor discoid encloses or covers at least the non-planar periphery of the rim and bonds thereto. Composite rotors so produced have been shown to have exceptionally uniform stress distribution during vehicle braking.

13 Claims, 3 Drawing Sheets

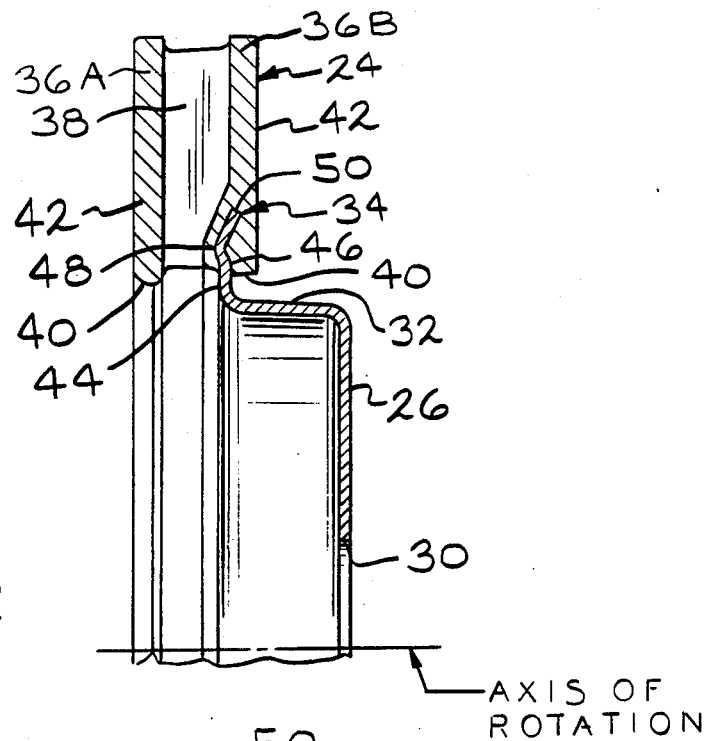
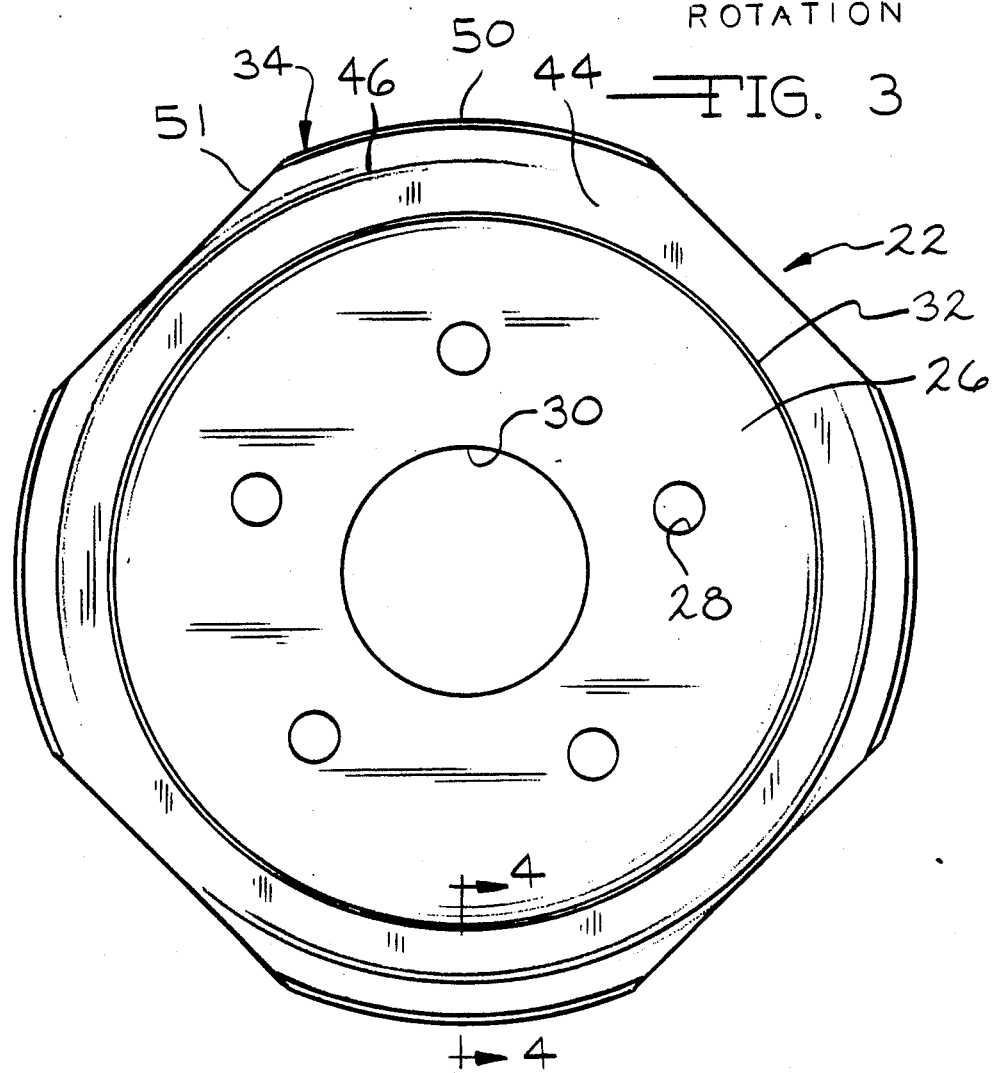

DISC BRAKE ROTOR

BACKGROUND OF THE INVENTION

1. Field of the Invention

This invention relates to the field of composite rotors for use in automotive disc brake assemblies having an improved hat section.

2. Description of the Prior Art

Heretofore, composite rotors have been produced commercially by forming a hat section including a planar, peripheral rim, treating the surface of the hat section to facilitate the bonding of molten metal thereto and casting a rotor discoid about the periphery of the hat section so that the rotor discoid overlaps and bonds to the rim of the hat section. Prior art hat sections generally included coplanar projections which extended radially outward from the rim to facilitate mechanical interlocking between the hat section and the rotor discoid cast therearound.

SUMMARY OF THE INVENTION

The present invention is based upon the discovery of an improved composite rotor and an improved hat section structure therefor. The hat section is formed to include a rim having a non-planar, rotor-engaging periphery. A rotor discoid is then cast around the hat section so that a portion of the rotor discoid encloses or covers at least the non-planar periphery of the rim and bonds thereto. Composite rotors so produced have been shown to have exceptionally uniform stress distribution during vehicle braking. Consequently, a composite rotor according to the present invention can withstand extreme thermal and mechanical stresses.

BRIEF DESCRIPTION OF THE DRAWINGS

FIG. 2 is a sectional view taken along the section lines 2—2 of FIG. 1.

FIG. 3 is a plan view of one embodiment of an improved hat section, before incorporation thereof into a composite rotor according to the present invention.

DETAILED DESCRIPTION OF THE INVENTION

Figure 1:
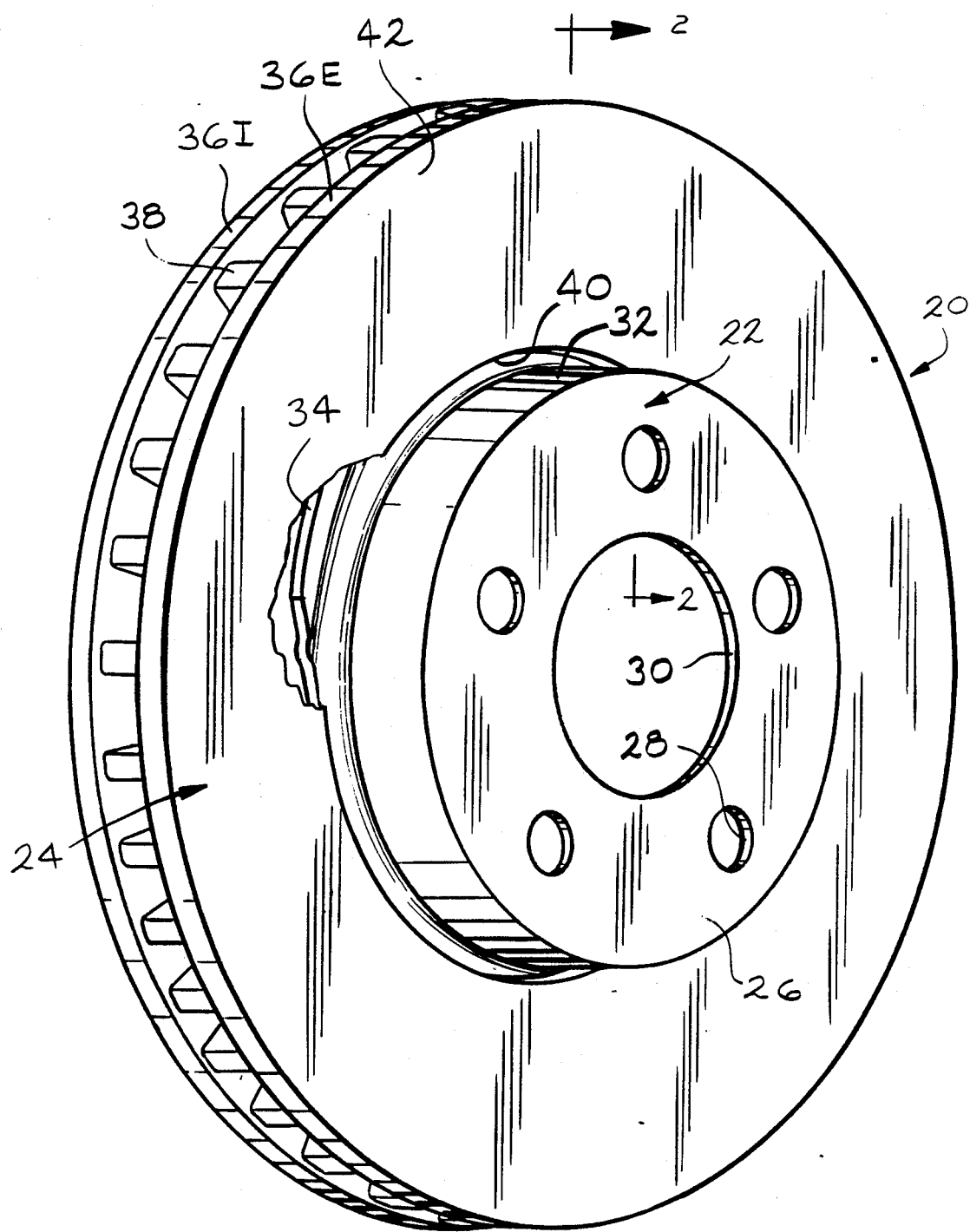
FIG. 1 is a perspective view of a composite rotor in accordance with the present invention.

Referring now to FIG. 1, a composite rotor according to the present invention is indicated generally at 20. The rotor 20 is composite in the sense that it comprises a hat section 22, formed for example, by stamping, and a rotor discoid 24 which is formed by casting it around the previously formed hat section 22. Thus, the composite rotor 20 is to be distinguished from other types of rotors in which the hat section and the rotor discoid are one piece and made by a casting process, referred to in the industry as "all-cast", "uni-cast" or "full cast".

The hat section 22 comprises a radially oriented mounting flange 26 having a plurality of apertures 28 extending therethrough for receiving wheel mounting lug bolts (not shown. A central pilot aperture 30 is provided in the mounting flange 26. A cylindrical, axially-oriented barrel portion 32 typically extends between and connects the mounting flange 26 and the rim flange 34.

The rotor discoid 24 comprises an inboard friction plate 36A and an outboard friction plate 36B typically held in a fixed, spaced-apart relationship by cooling fins 38. The rotor discoid 24 illustrated in FIG. 1 is vented, with reference to openings between adjacent cooling fins 38. The openings extend from the periphery of the rotor discoid 24 and extend radially inward to the internal shoulders 40 provided on the friction plates 36A and 36B. Thus, cooling air can pass between the friction plates 36A and 36B to dissipate heat generated by braking friction between the friction pads of an associated caliper assembly (not shown) and friction surfaces 42 provided on the exterior of friction plates 36A and 36B. The invention is not limited, however to vented rotors and the term rotor discoid is used herein to refer generically to all types of rotor structures including those of the vented and nonvented varieties.

As shown in FIG. 2, a peripheral portion of the rim flange 34 of hat section 22 extends well into the outboard friction plate 36B. The internal shoulder 40 on the outboard friction plate 36B is generally thicker than the corresponding internal shoulder 40 on the inboard friction plate 36A to provide additional structural strength in the region of the interface between the rim flange 34 and the friction plate 36B.

The rim flange 34 has a complex configuration comprising distinct regions including two circumferential grooves. Adjacent to the barrel portion 32, there is a planar transition region 44. Positioned radially outward from the planar transition region 44 is an outboard crown region 46 opposite a first groove and, radially outward therefrom, is an inboard crown region 48 which is opposite a second groove. Positioned radially outward from the inboard crown region 48 is a free end 50 of the rim flange 34. By virtue of the crown regions 46 and 48 and the corresponding grooves, the rim flange 34 is non-planar.

Dynamometer testing of composite rotors according to the present invention and prior art composite rotors with hat sections including planar rim flanges has been carried out. It should be noted that this testing was not designed to simulate service conditions but, rather, was designed to test the outer limits of rotor durability because it is anticipated that current trends to reduce the overall weight in automotive design will continue. Two of these trends call for more durable composite rotors, namely, the weight of automobiles is again increasing and the amount of space available for rotors is decreasing. Thus, the next generation of rotors will have to be smaller, lighter in weight and more durable. Rotors according to the present invention respond to both needs, as demonstrated in the dynamometer testing referred to above and described below.

Composite rotors according to the present invention have been produced having rotor discoids cast from the type of grey iron commonly used in the manufacture of such rotors.

Hat structures for the composite rotors were stamped from HSLA 950X steel. The composite rotors were mounted on a dynamometer equipped with a typical fist type caliper disc brake and repeatedly subjected to a sequence of:

| | |
|---|---|
| four | (1) acceleration to 1456 rpm; |
| cycles | (2) deceleration, by braking, at the rate of 5 |

| | | |
|---|---|---|
| | | feet per second per second, to a full stop. and |
| four cycles | (1) | acceleration to 1456 rpm; |
| | (2) | deceleration by braking at the rate of 20 feet per second per second, to a full stop |

Composite rotors according to the present invention, without exception, withstood 57 repetitions of the foregoing sequence of testing. This testing also established that composite rotors according to the present invention are less sensitive to imperfections in bonding between the hat section and the cast discoid section than the prior art composite rotors. The integrity of a composite rotor according to the present invention is less dependent upon bonding of the cast discoid to the rim flange than the prior art composite rotors. Yet another advantage of the present invention is the fact that hat sections according to the present invention promote better bonding between the rim flange and the rotor discoid than prior art hat sections.

In a method for producing a composite rotor according to the present invention, a hat section 22 is produced, for example by stamping, and placed in a suitable mold. Molten material, for example, grey iron, is then introduced into the mold to form a rotor discoid 24, including an outboard friction plate 36B enveloping at least the complex portion of rim flange 34. Various grey iron alloys can be used to cast the rotor discoid. The selection of a specific iron alloy is deemed to be within the province of those skilled in the art and forms no part of the instant invention. Similarly, the selection of a specific material for the hat section is also believed to be a matter of choice well within the purview of those skilled in the art.

Bonding between the rotor discoid and the rim flange provides adequate resistance to relative rotation therebetween. Additional resistance to rotation between the rotor discoid and the rim flange may be achieved by providing flats 51 on the periphery of the rim flange 34, as shown in FIG. 3. Although four flats 51 are illustrated, fewer or more than four flats may be provided, as desired; the range extending from a minimum of one flat to a maximum of 24 flats.

Figure 4:
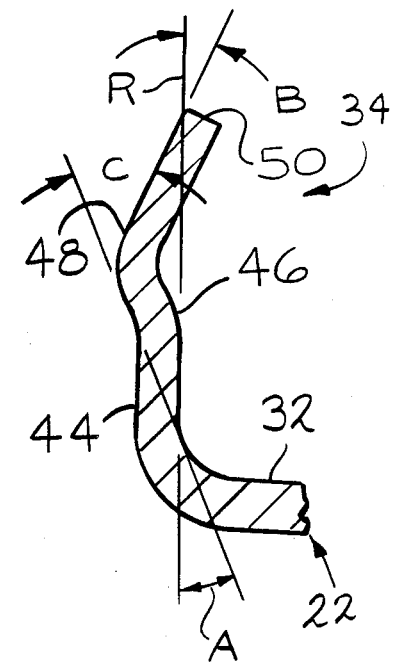
FIG. 4 is a sectional view taken along the line 4—4 of FIG. 3.

Further details relating to the configuration of the rim flange 34 are illustrated in FIG. 4. A reference line R is illustrated as extending perpendicularly from the axis (not illustrated) of the hat section 22. The planar transition section 44 is preferably parallel to reference line R. At the outboard crown region 46, rim flange 34 diverges from the reference line R by an amount corresponding with angle A. Angle A and the amount by which the rim flange 34 diverges from the reference line R is between 5° and 45° and, preferably, about 20°. At the inboard crown 48, rim flange 34 diverges in the opposite direction preferably by an amount greater than the angle A so that the portion of the rim flange 34, between the inboard crown 48 and the free end 50, forms an angle B relative to the reference line R. Angle B is between 5° and 45° and, preferably, about 20°. The amount by which rim flange 34 diverges at the inboard crown 48 corresponds with angle C. As shown in FIG. 4, angle C is greater than angle A and the sum of angles A and B is equal to angle C.

The cross-sectional configuration of rim flange 34 as illustrated in FIG. 4 is preferred, but other non-planar configurations are deemed to be within the scope of the present invention.

Figure 5:
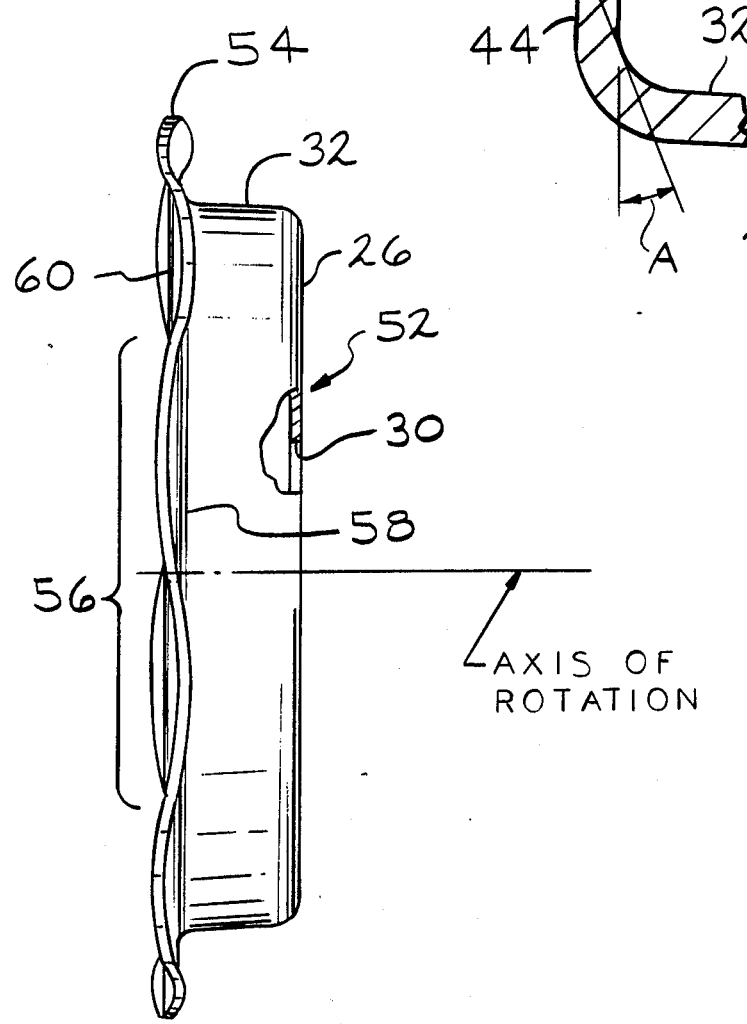
FIG. 5 is an end view of an alternate embodiment of an improved hat section according to the present invention.

With reference to FIG. 5, a second embodiment of a hat section according to the instant invention is indicated generally at 52. The hat section 52 includes a mounting flange 26 that corresponds with the mounting flange 26 of the hat section 22 and a corresponding central aperture 30. A cylindrical region 32 connects the mounting flange 26 to a rim flange 54. In order to prevent relative rotation between the hat section 52 and an associated cast rotor discoid, the rim flange 54 is scalloped at its peripheral edge. The number of scallops is a function of several rotor parameters, including rotor diameter. It ranges from a low of three scallops in the periphery of the rim flange to a high of 60 scallops. The preferred number being four scallops. The rim flange 54 is also provided with an outboard crown 58 and an inboard crown 60 corresponding respectively with the outboard crown 46 and the inboard crown 48 of the hat section 22.

The foregoing description sets forth the best mode for practicing the instant invention and is intended to enable those skilled in the art to practice it. Modifications and alterations may occur to those skilled in the art but fall, nonetheless, within the spirit and scope of the appended claims.

We claim:

1. A composite disc brake rotor assembly comprising a hat section having an axis of rotation, a central mounting flange and a rim flange having a non-planar portion thereof, said rim flange connected to said mounting flange and generally extending radially outward from said axis, and a rotor discoid cast coaxially about said hat section enveloping, the non-planar portion of said rim flange such that braking forces applied to the rotor discoid are transmitted to said hat section.

2. The composite rotor claimed in claim 1 having at least one flat on the periphery of said rim flange.

3. The composite rotor claimed in claim 1 wherein the non-planar rim flange has at least one circumferential crown and wherein a portion of the flange extends in a non-radial direction.

4. The composite rotor claimed in claim 1 wherein said rim flange includes two, opposed, circumferential crowns.

5. A hat section for use in a composite disc brake rotor assembly, said hat section having an axis of rotation and comprising a central mounting flange and a circumferential rim flange connected to said mounting flange, said rim flange generally extending radially outward from said axis and including at least one axial undulation extending circumferentially about said axis.

6. A hat section for use in a composite disc brake rotor assembly, said hat section having an axis of rotation and comprising a central mounting flange and a circumferential, non-planar rim flange circumscribing said mounting flange and connected thereto, said rim flange generally extending radially outward from said axis and having at least one flat on the periphery thereof.

7. The hat section claimed in claim 6 wherein said non-planar rim flange has at least one circumferential crown and wherein a portion of said flange extends in a non-radial direction.

8. The hat section claimed in claim 6 wherein said rim flange includes two, opposed circumferential crowns.

9. A composite disc brake rotor assembly comprising a hat section an axis of rotation, a mounting flange and a circumferential, non-planar rim flange portion connected to said mounting flange, said rim flange generally extending radially outward from said axis, said non-planar rim flange having a substantially uniform cross-section throughout its circumference and including an inboard crown and an outboard crown, a rotor discoid cast coaxially about said hat section enveloping said non-planar rim flange portion radially outward from said inboard crown whereby braking forces applied to said discoid are transmitted to said hat section.

10. In a composite disc brake rotor assembly having a stamped metal hat section wherein said hat section includes a central mounting flange having a transverse axis of rotation, a rim flange circumscribing said mounting flange, means for affixing said rim flange to said mounting flange and a cast metal discoid circumscribing and enveloping a portion of said mounting flange, the improvement wherein the portion of said rim flange enveloped by said discoid includes at least one axial undulation extending radially outward from said axis.

11. The improvement as claimed in claim 10 wherein said rim flange further includes at least one flat on the periphery thereof.

12. The improvement as claimed in claim 10 wherein said rim flange includes at least one circumferential undulation.

13. In a composite disc brake rotor having a stamped metal hat section said hat section includes a central mounting flange having a transverse axis of rotation, and a rim flange circumscribing said central mounting flange, the improvement wherein said rim flange includes at least one circumferential undulation.

* * * * *